(12) United States Patent
Kirk et al.

(10) Patent No.: US 7,790,012 B2
(45) Date of Patent: Sep. 7, 2010

(54) LOW ENERGY ELECTROCHEMICAL HYDROXIDE SYSTEM AND METHOD

(75) Inventors: Donald W. Kirk, Caledon (CA); J. Douglas Way, Boulder, CO (US); Allen J. Bard, Austin, TX (US); Ryan J. Gilliam, Campbell, CA (US); Kasra Farsad, San Jose, CA (US); Valentin Decker, San Francisco, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/375,632

(22) PCT Filed: Dec. 23, 2008

(86) PCT No.: PCT/US2008/088242

§ 371 (c)(1),
(2), (4) Date: Mar. 5, 2009

(87) PCT Pub. No.: WO2010/074686

PCT Pub. Date: Jul. 1, 2010

(65) Prior Publication Data

US 2010/0155258 A1      Jun. 24, 2010

(51) Int. Cl.
*C25B 1/14* (2006.01)

(52) U.S. Cl. .............. 205/510; 205/514; 205/555; 204/263; 204/265

(58) Field of Classification Search ............. 205/510, 205/514, 555; 204/263, 265
See application file for complete search history.

(56) References Cited

U.S. PATENT DOCUMENTS

| | | |
|---|---|---|
| 1,678,345 A | 7/1928 | Mattison |
| 1,865,833 A | 7/1932 | Chesny |
| 1,897,725 A | 2/1933 | Gaus et al. |
| 2,383,674 A | 8/1945 | Osborne |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,179,579 A | 4/1965 | Gustave et al. |
| 3,350,292 A | 10/1967 | Weinberger et al. |
| 3,374,164 A | 3/1968 | Balej et al. |
| 3,420,775 A | 1/1969 | Cadwallader |

(Continued)

FOREIGN PATENT DOCUMENTS

AU    2007100157    4/2007

(Continued)

OTHER PUBLICATIONS

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

(Continued)

*Primary Examiner*—Arun S Phasge

(57) ABSTRACT

A low-energy method and system of forming hydroxide ions in an electrochemical cell. On applying a low voltage across the anode and cathode, hydroxide ions form in the electrolyte containing the cathode, protons form at the anode but a gas e.g. chlorine or oxygen does not form at the anode.

47 Claims, 8 Drawing Sheets

U.S. PATENT DOCUMENTS

| | | | |
|---|---|---|---|
| 3,463,814 A | 8/1969 | Blanco et al. | |
| 3,466,169 A | 9/1969 | Nowak et al. | |
| 3,511,595 A | 5/1970 | Fuchs | |
| 3,511,712 A | 5/1970 | Giner | |
| 3,525,675 A | 8/1970 | Gaudin | |
| 3,574,530 A | 4/1971 | Suriani et al. | |
| 3,627,479 A | 12/1971 | Yee | |
| 3,725,267 A | 4/1973 | Gelblum | |
| 3,864,236 A * | 2/1975 | Lindstrom | 204/265 |
| 3,917,795 A | 11/1975 | Pelczarski et al. | |
| 3,925,534 A | 12/1975 | Singleton et al. | |
| 3,953,568 A | 4/1976 | Seko et al. | |
| 3,963,592 A | 6/1976 | Lindstrom | |
| 3,970,528 A | 7/1976 | Zirngiebl et al. | |
| 4,026,716 A | 5/1977 | Urschel, III et al. | |
| 4,036,749 A | 7/1977 | Anderson | |
| 4,080,270 A | 3/1978 | O'Leary et al. | |
| 4,107,022 A | 8/1978 | Strempel et al. | |
| 4,140,510 A | 2/1979 | Scholze et al. | |
| 4,147,599 A | 4/1979 | O'Leary et al. | |
| 4,188,291 A | 2/1980 | Anderson | |
| 4,217,186 A | 8/1980 | McRae | |
| 4,242,185 A | 12/1980 | McRae | |
| 4,246,075 A | 1/1981 | Hilbertz | |
| 4,264,367 A | 4/1981 | Schutz | |
| 4,335,788 A | 6/1982 | Murphey et al. | |
| 4,361,475 A | 11/1982 | Moeglich | |
| 4,370,307 A | 1/1983 | Judd | |
| 4,376,101 A | 3/1983 | Sartori et al. | |
| 4,410,606 A | 10/1983 | Loutfy et al. | |
| 4,450,009 A | 5/1984 | Childs et al. | |
| 4,477,573 A | 10/1984 | Taufen | |
| 4,561,945 A | 12/1985 | Coker et al. | |
| 4,620,969 A * | 11/1986 | Wilkinson | 423/421 |
| 4,716,027 A | 12/1987 | Morrison | |
| 4,804,449 A | 2/1989 | Sweeney | |
| 4,818,367 A | 4/1989 | Winkler | |
| 4,838,941 A | 6/1989 | Hill | |
| 4,899,544 A | 2/1990 | Boyd | |
| 4,915,914 A | 4/1990 | Morrison | |
| 4,931,264 A | 6/1990 | Rochelle et al. | |
| 5,037,286 A | 8/1991 | Roberts | |
| 5,100,633 A | 3/1992 | Morrison | |
| 5,230,734 A | 7/1993 | Kumasaka et al. | |
| 5,246,551 A | 9/1993 | Pletcher et al. | |
| 5,282,935 A | 2/1994 | Cawlfield et al. | |
| 5,362,688 A | 11/1994 | Porta et al. | |
| 5,364,611 A | 11/1994 | Iijima et al. | |
| 5,366,513 A | 11/1994 | Goldmann et al. | |
| 5,470,671 A | 11/1995 | Fletcher et al. | |
| 5,531,821 A | 7/1996 | Wu | |
| 5,531,865 A | 7/1996 | Cole | |
| 5,584,923 A | 12/1996 | Wu | |
| 5,584,926 A | 12/1996 | Borgholm et al. | |
| 5,595,641 A | 1/1997 | Traini et al. | |
| 5,614,078 A | 3/1997 | Lubin et al. | |
| 5,624,493 A | 4/1997 | Wagh et al. | |
| 5,702,585 A * | 12/1997 | Hillrichs et al. | 205/468 |
| 5,766,339 A | 6/1998 | Babu et al. | |
| 5,776,328 A | 7/1998 | Traini et al. | |
| 5,785,868 A | 7/1998 | Li et al. | |
| 5,846,669 A | 12/1998 | Smotkin et al. | |
| 5,855,759 A | 1/1999 | Keating et al. | |
| 5,925,255 A | 7/1999 | Mukhopadhyay | |
| 6,024,848 A | 2/2000 | Dufner et al. | |
| 6,059,974 A | 5/2000 | Scheurman, III | |
| 6,071,336 A | 6/2000 | Fairchild et al. | |
| 6,080,297 A | 6/2000 | Ayers | |
| 6,129,832 A | 10/2000 | Fuhr et al. | |
| 6,180,012 B1 | 1/2001 | Rongved | |
| 6,200,543 B1 | 3/2001 | Allebach et al. | |
| 6,217,728 B1 | 4/2001 | Lehmann et al. | |
| 6,235,186 B1 | 5/2001 | Tanaka et al. | |
| 6,251,356 B1 | 6/2001 | Mathur | |
| 6,280,505 B1 | 8/2001 | Torkildsen et al. | |
| 6,352,576 B1 | 3/2002 | Spencer et al. | |
| 6,375,825 B1 | 4/2002 | Mauldin et al. | |
| 6,402,831 B1 | 6/2002 | Sawara et al. | |
| 6,444,107 B2 | 9/2002 | Hartel et al. | |
| 6,475,460 B1 | 11/2002 | Max | |
| 6,495,013 B2 | 12/2002 | Mazur et al. | |
| 6,518,217 B2 | 2/2003 | Xing et al. | |
| 6,537,456 B2 | 3/2003 | Mukhopadhyay | |
| 6,602,630 B1 | 8/2003 | Gopal | |
| 6,623,555 B1 | 9/2003 | Haverinen et al. | |
| 6,638,413 B1 | 10/2003 | Weinberg et al. | |
| 6,648,949 B1 | 11/2003 | Der et al. | |
| 6,712,946 B2 | 3/2004 | Genders et al. | |
| 6,755,905 B2 | 6/2004 | Oates et al. | |
| 6,776,972 B2 | 8/2004 | Vohra et al. | |
| 6,786,963 B2 | 9/2004 | Matherly et al. | |
| 6,841,512 B1 | 1/2005 | Fetcenko et al. | |
| 6,890,419 B2 | 5/2005 | Reichman et al. | |
| 6,890,497 B2 | 5/2005 | Rau et al. | |
| 6,908,507 B2 | 6/2005 | Lalande et al. | |
| 7,037,434 B2 | 5/2006 | Myers et al. | |
| 7,132,090 B2 | 11/2006 | Dziedzic et al. | |
| 7,135,604 B2 | 11/2006 | Ding et al. | |
| 7,198,722 B2 | 4/2007 | Hussain | |
| 7,261,912 B2 | 8/2007 | Zeigler | |
| 7,285,166 B2 | 10/2007 | Luke et al. | |
| 7,347,896 B2 | 3/2008 | Harrison | |
| 7,427,449 B2 | 9/2008 | Delaney et al. | |
| 7,440,871 B2 | 10/2008 | McConnell et al. | |
| 7,452,449 B2 | 11/2008 | Weinberg et al. | |
| 2001/0022952 A1 | 9/2001 | Rau et al. | |
| 2001/0054253 A1 | 12/2001 | Takahashi et al. | |
| 2002/0009410 A1 | 1/2002 | Mathur | |
| 2002/0127474 A1 | 9/2002 | Fleischer et al. | |
| 2003/0017088 A1 | 1/2003 | Downs et al. | |
| 2003/0126899 A1 | 7/2003 | Wolken | |
| 2003/0188668 A1 | 10/2003 | Bland | |
| 2004/0040671 A1 | 3/2004 | Duesel, Jr. et al. | |
| 2004/0040715 A1 | 3/2004 | Wellington et al. | |
| 2004/0052865 A1 | 3/2004 | Gower et al. | |
| 2004/0126293 A1 | 7/2004 | Geerlings et al. | |
| 2004/0213705 A1 | 10/2004 | Blencoe et al. | |
| 2004/0219090 A1 | 11/2004 | Dziedzic et al. | |
| 2004/0228788 A1 | 11/2004 | Nagai et al. | |
| 2004/0231568 A1 | 11/2004 | Morioka et al. | |
| 2004/0259231 A1 | 12/2004 | Bhattacharya | |
| 2004/0267077 A1 | 12/2004 | Ding et al. | |
| 2005/0002847 A1 | 1/2005 | Maroto-Valer et al. | |
| 2005/0011770 A1 | 1/2005 | Katsuyoshi et al. | |
| 2005/0031522 A1 | 2/2005 | Delaney et al. | |
| 2005/0036932 A1 | 2/2005 | Takahashi et al. | |
| 2005/0087496 A1 | 4/2005 | Borseth | |
| 2005/0118081 A1 | 6/2005 | Harris et al. | |
| 2005/0129606 A1 | 6/2005 | Mitsuhashi et al. | |
| 2005/0180910 A1 | 8/2005 | Park et al. | |
| 2005/0238563 A1 | 10/2005 | Eighmy et al. | |
| 2005/0255174 A1 | 11/2005 | Shelley et al. | |
| 2006/0048517 A1 | 3/2006 | Fradette et al. | |
| 2006/0051274 A1 | 3/2006 | Wright et al. | |
| 2006/0060532 A1 | 3/2006 | Davis | |
| 2006/0105082 A1 | 5/2006 | Zeigler | |
| 2006/0165583 A1 | 7/2006 | Makino et al. | |
| 2006/0169593 A1 | 8/2006 | Xu et al. | |
| 2006/0184445 A1 | 8/2006 | Sandor et al. | |
| 2006/0185516 A1 | 8/2006 | Moriyama et al. | |
| 2006/0185560 A1 | 8/2006 | Ramme et al. | |
| 2006/0185985 A1 | 8/2006 | Jones | |
| 2006/0195002 A1 | 8/2006 | Grandjean et al. | |
| 2006/0196836 A1 | 9/2006 | Arakel et al. | |

| | | | |
|---|---|---|---|
| 2006/0288912 A1 | 12/2006 | Sun et al. | |
| 2007/0056487 A1 | 3/2007 | Anthony et al. | |
| 2007/0092427 A1 | 4/2007 | Anthony et al. | |
| 2007/0148509 A1 | 6/2007 | Colbow et al. | |
| 2007/0163443 A1 | 7/2007 | Moriyama et al. | |
| 2007/0187247 A1 | 8/2007 | Lackner et al. | |
| 2007/0202032 A1 | 8/2007 | Geerlings et al. | |
| 2007/0212584 A1 | 9/2007 | Chuang | |
| 2007/0217981 A1 | 9/2007 | Van Essendelft | |
| 2007/0240570 A1 | 10/2007 | Jadhav et al. | |
| 2007/0261947 A1 | 11/2007 | Geerlings et al. | |
| 2008/0031801 A1 | 2/2008 | Lackner et al. | |
| 2008/0112868 A1 | 5/2008 | Blencoe et al. | |
| 2008/0138265 A1 | 6/2008 | Lackner et al. | |
| 2008/0171158 A1 | 7/2008 | Maddan | |
| 2008/0223727 A2 | 9/2008 | Oloman et al. | |
| 2008/0236143 A1 | 10/2008 | Lo | |
| 2008/0245274 A1 | 10/2008 | Ramme | |
| 2008/0245660 A1 | 10/2008 | Little et al. | |
| 2008/0245672 A1 | 10/2008 | Little et al. | |
| 2008/0248350 A1 | 10/2008 | Little et al. | |
| 2008/0277319 A1 | 11/2008 | Wystra | |
| 2008/0289495 A1 | 11/2008 | Eisenberger et al. | |
| 2009/0001020 A1 | 1/2009 | Constantz et al. | |
| 2009/0010827 A1 | 1/2009 | Geerlings et al. | |
| 2009/0081093 A1 | 3/2009 | Comrie | |
| 2009/0081096 A1 | 3/2009 | Pellegrin | |
| 2009/0090277 A1 | 4/2009 | Joshi et al. | |
| 2009/0169452 A1 | 7/2009 | Constantz et al. | |
| 2009/0186244 A1 | 7/2009 | Mayer | |
| 2009/0301352 A1 | 12/2009 | Constantz et al. | |
| 2010/0024686 A1 | 2/2010 | Constantz et al. | |

FOREIGN PATENT DOCUMENTS

| | | |
|---|---|---|
| CA | 1335974 A1 | 6/1995 |
| DE | 2653649 A1 | 6/1978 |
| DE | 3146326 A1 | 6/1983 |
| DE | 3638317 A1 | 6/1987 |
| DE | 19523324 A1 | 9/1994 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 2371810 | 8/2002 |
| JP | 51102357 A1 | 9/1976 |
| JP | 59100280 | 6/1984 |
| JP | 63-312988 | 12/1988 |
| JP | 2003041388 | 2/2003 |
| WO | WO 93/16216 A1 | 8/1993 |
| WO | WO 96/34997 A1 | 11/1996 |
| WO | WO 99/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/078836 A2 | 8/2005 |
| WO | WO 2005/086843 A2 | 9/2005 |
| WO | WO 2005/108297 A2 | 11/2005 |
| WO | WO 2006/009600 A2 | 1/2006 |
| WO | WO 2006/034339 A1 | 3/2006 |
| WO | WO 2006/036396 A2 | 4/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/071633 A1 | 6/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/039655 A1 | 4/2009 |
| WO | WO 2009/065031 A1 | 5/2009 |
| WO | WO 2009/070273 A1 | 6/2009 |
| WO | WO 2009/086460 A1 | 7/2009 |

OTHER PUBLICATIONS

Cannell, M.G.R. 2003. "Carbon sequestration and biomass energy offset: theoretical, potential and achievable capacities globally, in Europe and the UK." Biomass and Bioenergy. 24: 97-116.

Levy, D. "Burnt biomass causes short-term global cooling, long-term warming." http://news-service.stanford.edu/news/2004/august4/biomass-84.html. 3 pages.

Turner, J.A. 1999. "A Realizable Renewable Energy Future." Science. 285 (5428): 687-689.

Wright, L.L., et al. 1993. "U.S. Carbon Offset Potential Using Biomass Energy Systems." Water, Air, and Soil Pollution. 70: 483-497.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Rau, G. 2004. Possible use of Fe/CO2 fuel cells for CO2 mitigation plus H2 and electricity production. *Energy Conversion and Management*. 45: 2143-2152.

Aker, "Aker Clean Carbon, Carbon Capture Solutions Provider" Aker Clean Carbon Presentation for UN's IPCC; Jan. 24 (2008); 8pp.

Alexander, G. et al., "Evaluation of reaction variables in the dissolution of serpentine for mineral carbonation"; Elsevier; ScienceDirect Fuel 86 (2007) 273-281.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

CICCS "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

International Search Report dated Feb. 19, 2009 of PCT/US08/88242.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Mazrou, S., et al. 1997. Sodium hydroxide and hydrochloric acid generation from sodium chloride and rock salt by electro-electrodialysis. *Journal of Applied Electrochemistry* 27: 558-567.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies And Current Status"; Albany Research Center, Albany Oregon; Office of Fossil Energy, US Dept. of Energy; 1st Annual DOE Carbon Sequestration Conference, Washington DC, May 2001 12pp.

Park, A., et al. 2004. CO2 mineral sequestration: physically activated dissolution of serpentine and pH swing process. *Chemical Engineering Science* 59 (22-23): 5241-5247.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions; "ADIP-X and Sulfinol-X—new regenerable acid-gas removal processes"; Shell Global Solutions International; OG 130210370903-En(A); www.shellglobalsoultions.com 2 pp.

TECECO PTY LTD, "Eco-Cement"; www.tececo.com/simple.eco-cement.php; Dec. 29, 2008; 6pp.

Back, M. et al.,"Reactivity of Alkaline Lignite Fly Ashes Towards CO in Water." Environmental Science & Technology. vol. 42, No. 12 (2008) pp. 4520-4526.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 22, 2009 of PCT/US2009/047711.

International Search Report dated Sep. 17, 2009 PCT/US2009/50756.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Lackner, K.S. et al. "Carbon Dioxide Disposal in Carbonate Minerals." Energy. 1995. 20(11): 1153-1170.

Montes-Hernandez, G. et al.,"Mineral sequestration of CO2 by aqueous carbonation of coal combustion fly-ash." Journal of Hazardous Materials vol. 161 (2009). pp. 1347-1354.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Sadhwani et al., "Case Studies on environmental impact of seawater desalination" Science Direct; http://www.sciencedirect.com/science?_ob=ArticleURL&_udi=B6TFX-4HMX97J-3&_u... 3pp.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

International Search Report dated Oct. 19, 2009 of PCT/US2009/050223.

International Search Report dated Oct. 30, 2009 of PCT/US09/056573.

* cited by examiner

LOW ENERGY ELECTROCHEMICAL HYDROXIDE SYSTEM AND METHOD

BACKGROUND

In many chemical processes a solution of hydroxide ions (OH⁻) is required to achieve or modulate a chemical reaction. One way to obtain OH⁻ in a solution is to dissolve an alkali hydroxide such as sodium hydroxide or magnesium hydroxide in the solution. However, conventional processes for producing hydroxides are very energy intensive, e.g., the chlor-alkali process, and they emit significant amounts of carbon dioxide and other greenhouse gases into the environment.

SUMMARY

In various embodiments the present invention pertains to a low energy electrochemical system and method of producing OH⁻ utilizing an ion exchange membrane in an electrochemical cell. The system in one embodiment comprises an anionic or cationic exchange membrane positioned between a first electrolyte and a second electrolyte, the first electrolyte contacting an anode and the second electrolyte contacting a cathode. Suitable electrolytes comprise a saltwater including sodium chloride, seawater, brackish water or freshwater. On applying a low voltage across the anode and cathode, OH⁻ forms at the cathode and protons form at the anode without a gas, e.g., chlorine or oxygen, forming at the anode. Depending on the electrolytes used, a hydroxide solution, e.g., sodium hydroxide, forms in the second electrolyte in contact with the cathode and an acid, e.g., hydrochloric acid forms in the first electrolyte in contact with the anode. In various embodiments, OH⁻ forms when a volt of less than 0.1 V is applied across the electrodes.

In another embodiment the system comprises an electrochemical cell in which an anion exchange membrane separates a first electrolyte from a third electrolyte; a cation exchange membrane separates the third electrolyte from a first electrolyte; an anode is in contact with the first electrolyte; and a cathode is in contact with the second electrolyte. On applying a low voltage across the anode and cathode, OH⁻ forms at the cathode without a gas, e.g., chlorine or oxygen forming at the anode. Depending on the electrolyte used, a hydroxide solution, e.g., sodium hydroxide, forms in the second electrolyte in contact with the cathode, and an acid, e.g., hydrochloric acid forms in the first electrolyte in contact with the anode. In various embodiments, OH⁻ forms when a volt of less than 0.1 V is applied across the electrodes.

In one embodiment the method comprises migrating ions across an ion exchange membrane that is situated between a first electrolyte and a second electrolyte, the first electrolyte contacting an anode and the second electrolyte contacting a cathode, by applying a voltage across the anode and cathode to form hydroxide ions at the cathode without forming a gas, e.g., chlorine or oxygen at the anode. Depending on the electrolyte used, a hydroxide solution, e.g., sodium hydroxide forms in the second electrolyte in contact with the cathode and an acid, e.g., hydrochloric acid forms in the first electrolyte in contact with the anode. In various embodiments, OH⁻ forms when a volt of less than 0.1 V is applied across the electrodes.

In another embodiment the method comprises applying a voltage across an anode and cathode, wherein (i) the anode is in contact with a first electrolyte that is also in contact with an anion exchange membrane; (ii) the cathode is in contact with a second electrolyte that is also in contact with a cation exchange membrane; and (iii) a third electrolyte is situated between the anion exchange membrane and the cation exchange membrane to form hydroxide ions at the cathode without forming a gas e.g., chlorine or oxygen at the anode. By the method OH⁻ forms at the cathode in contact the second electrolyte without a gas e.g., chlorine or oxygen at the anode. Depending on the electrolyte used, a hydroxide solution, e.g., sodium hydroxide, forms in the second electrolyte in contact with the cathode, and an acid, e.g., hydrochloric acid forms in the first electrolyte in contact with the anode. In various embodiments, OH⁻ forms when a volt of less than 0.1 V is applied across the electrodes.

In various configurations, the system and method are adapted for batch, semi-batch or continuous flows. Depending on the electrolytes used, the system is adaptable to form OH⁻ in solution, e.g., sodium hydroxide at the cathode, or an acidic solution, e.g., hydrochloric acid at the anode without forming a gas e.g., chlorine or oxygen at the anode. In various embodiments, the solution comprising OH⁻ can be used to sequester $CO_2$ by contacting the solution with $CO_2$ and precipitating alkaline earth metal carbonates, e.g., calcium and magnesium carbonates and bicarbonates from a solution comprising alkaline earth metal ions as described U.S. Provisional Patent Application Ser. No. 60/931,657 filed on May 24, 2007; U.S. Provisional Patent Application Ser. No. 60/937,786 filed on Jun. 28, 2007; U.S. Provisional Patent Application 61/017,419, filed on Dec. 28, 2007; U.S. Provisional Patent Application Ser. No. 61/017,371, filed on Dec. 28, 2007; and U.S. Provisional Patent Application Ser. No. 61/081,299, filed on Jul. 17, 2008, herein incorporated by reference. The precipitated carbonates, in various embodiments, are useable as building products, e.g., cements, as described in U.S. Patent Applications herein incorporated by reference. Similarly, the system and method are adaptable for desalinating water as described in U.S. Patent Applications herein incorporated by reference.

BRIEF DESCRIPTION OF THE DRAWINGS

The following drawings illustrate the present system and method by way of examples and not limitations. The methods and systems may be better understood by reference to one or more of these drawings in combination with the description herein.

DETAILED DESCRIPTION

Figure 1:
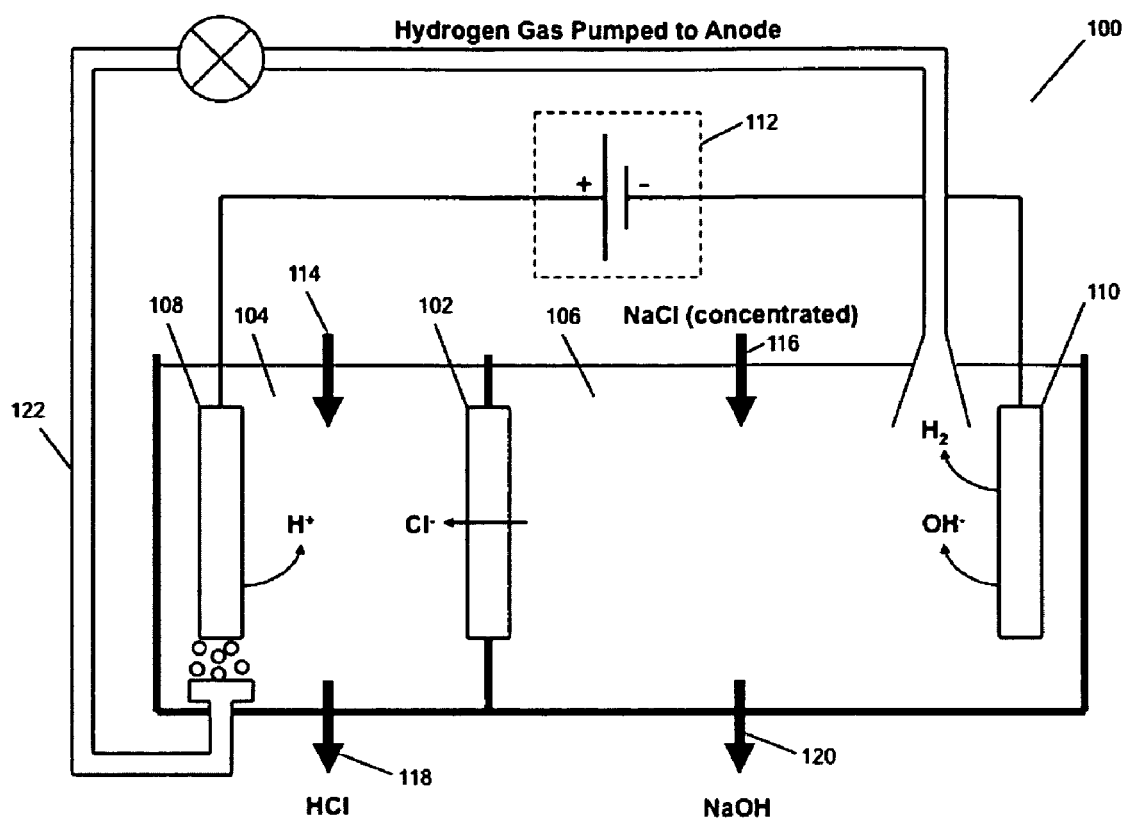
FIG. 1 is an illustration of an embodiment of the present system.

Before the present methods and systems are described in detail, it is to be understood that this invention is not limited to particular embodiments described and illustrated herein, and as such may vary. It is also to be understood that the terminology used herein is for the purpose of describing particular embodiments only, and is not intended to be limiting, since the scope of the present invention will be limited only by the appended claims.

Where a range of values is provided, it is to be understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Ranges are presented herein at times with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number that, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods, systems and materials similar or equivalent to those described herein can also be used in the practice or testing of the present invention, representative illustrative methods, systems and materials are herein described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates that may need to be independently confirmed.

As used herein and in the appended claims, the singular forms "a," "an," and "the" include plural references unless the context clearly dictates otherwise. Also, the claims may be drafted to exclude any optional element. As such, this statement is intended to serve as antecedent basis for use of such exclusive terminology as "solely," "only" and the like in connection with the recitation of claim elements, or use of a "negative" limitation. Additionally, the term "reservoir" as used herein refers to an enclosure for holding a liquid such as a vessel, tank, chamber or bag.

As will be apparent to those of skill in the art, each of the embodiments described and illustrated herein has discrete components and features which may be readily separated from or combined with the features of any of the other several embodiments without departing from the scope or spirit of the present invention. Any recited method can be carried out in the order of events recited or in any possible logical order.

In the description herein, the invention will be described for convenience in terms of production of hydroxide. It will be appreciated that in some embodiments hydroxide may not be produced, e.g., in embodiments where the pH of the electrolyte solution in contact with the cathode, as described herein, is kept constant or even decreases, there is no net production of hydroxide ions and can even be a decrease in hydroxide ion production. This can occur, e.g., in embodiments in which $CO_2$ is introduced into the second electrolyte solution, as described further herein.

The present invention in various embodiments is directed to a low voltage electrochemical system and method for forming $OH^+$ in a solution, e.g., a saltwater solution, utilizing ion exchange membranes. On applying a voltage across a cathode and an anode, $OH^+$ forms in solution in the electrolyte contacted with the cathode, protons form in the solution contacted with the anode, and a gas e.g., chlorine or oxygen is not formed at the anode. Hydroxide ions are formed where the voltage applied across the anode and cathode is less than 2.8, 2.7, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V.

In certain embodiments hydroxide ions are formed where the voltage applied across the anode and cathode is less than 2.5 V without the formation of gas at the anode. In certain embodiments hydroxide ions are formed where the voltage applied across the anode and cathode is less than 2.2V. In certain embodiments hydroxide ions are formed where the voltage applied across the anode and cathode is less than 2.0V. In certain embodiments hydroxide ions are formed where the voltage applied across the anode and cathode is less than 1.5 V. In certain embodiments hydroxide ions are formed where the voltage applied across the anode and cathode is less than 1.0V. In certain embodiments hydroxide ions are formed where the voltage applied across the anode and cathode is less than 0.8 V. In certain embodiments hydroxide ions are formed where the voltage applied across the anode and cathode is less than 0.7V. In certain embodiments hydroxide ions are formed where the voltage applied across the anode and cathode is less than 0.6V. In certain embodiments hydroxide ions are formed where the voltage applied across the anode and cathode is less than 0.5V. In certain embodiments hydroxide ions are formed where the voltage applied across the anode and cathode is less than 0.4V. In certain embodiments hydroxide ions are formed where the voltage applied across the anode and cathode is less than 0.3V. In certain embodiments hydroxide ions are formed where the voltage applied across the anode and cathode is less than 0.2V. In certain embodiments hydroxide ions are formed where the voltage applied across the anode and cathode is less than 0.1V. In certain embodiments hydroxide ions are formed where the voltage applied across the anode and cathode is less than 0.05V. In various embodiments an acidic solution, e.g., hydrochloric acid is formed in the electrolyte in contact with the anode.

Figure 2:
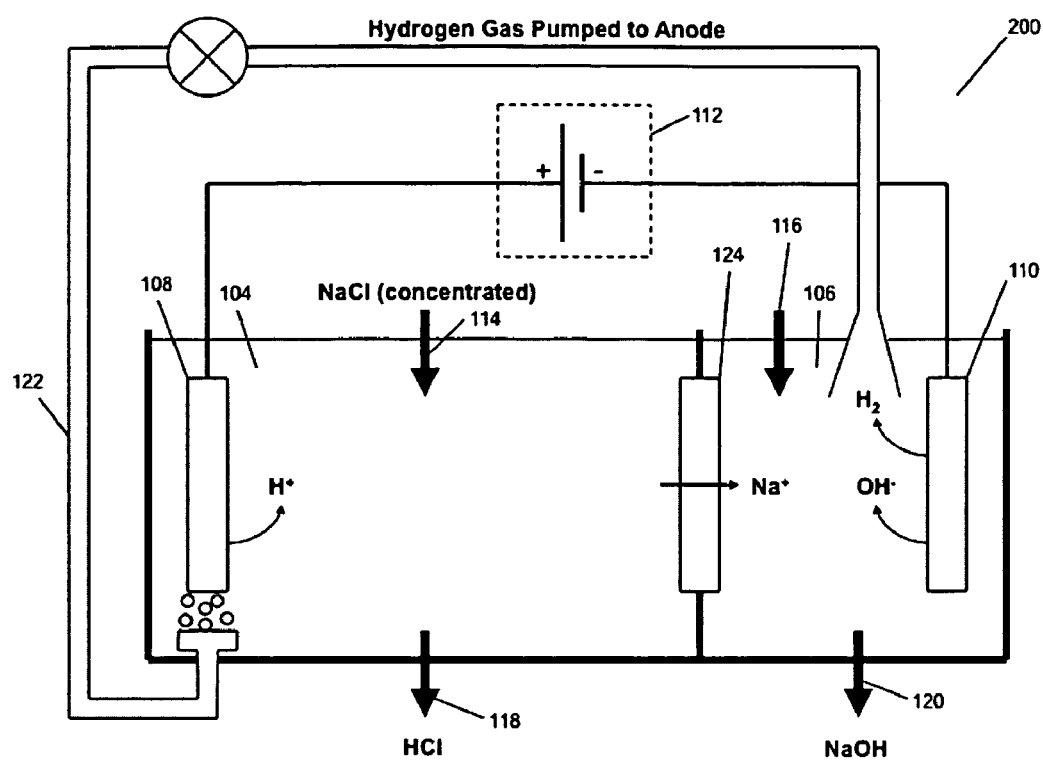
FIG. 2 is an illustration of an embodiment of the present system.

With reference to FIGS. 1-6, in various embodiments the present system is adaptable for batch and continuous processes as described herein. Referring to FIGS. 1 and 2, in one embodiment the system comprises an electrochemical system including an ion exchange membrane (102, 124) separating a first electrolyte (104) from a second electrolyte (106), the first electrolyte contacting an anode (108) and the second electrolyte contacting a cathode (110). As used herein, "ion exchange membrane" includes membranes that are selectively permeable to one ion, or one type of ion (e.g., anions, or monovalent anions, or cations, or monovalent cations). In the system as illustrated in FIG. 1, on applying a voltage across the anode and cathode, hydroxide ions form in the electrolyte contacting the cathode, protons form in the electrolyte contacting the anode without a gas e.g., chlorine or oxygen forming at the anode. In the illustration of FIG. 1, an anion exchange membrane (102) is utilized; in FIG. 2, a cation exchange membrane (124) is utilized.

In the embodiment illustrated in FIG. 1, first electrolyte (104) comprises an aqueous salt solution such as a saltwater, e.g., seawater, freshwater, brine, brackish water or the like. In various embodiments, second electrolyte (106) comprises a concentrated solution of sodium chloride; in other embodiments, second electrolyte may comprise saltwater. In the embodiment of FIG. 2, the first electrolyte (104) comprises a concentrated solution of sodium chloride, and second electrolyte (106) comprises an aqueous solution such as a saltwater, e.g., seawater, freshwater, brine, brackish water or the like. In an alternative embodiment, first electrolyte may comprise a saltwater.

In various embodiments, anion exchange membrane (102) and/or cation exchange membrane (124) are any ion exchange membranes suitable for use in an acidic and/or basic electrolytic solution temperatures in the range from about 0° C. to about 100° C., such as conventional ion exchange membranes well-known in the art, or any suitable ion exchange membrane. Suitable anion exchange membranes are available from PCA GmbH of Germany, e.g., an anion exchange membrane identified as PCSA-250-250 can be used; similarly, a cation exchange membrane identified as PCSK 250-250 available from PCA GmbH can be used. As will be appreciated, in the system the ion exchange membranes are positioned to prevent mixing of the first and second electrolytes.

With reference to FIGS. 1 and 2, in various embodiments the electrochemical system (100, 200) includes first electrolyte inlet port (114) for inputting first electrolyte (104) into the system and second electrolyte inlet port (116) for inputting second electrolyte (106) into the system. The cell includes outlet port (118) for draining first electrolyte from the system, and outlet port (120) for draining second electrolyte from the system. As will be appreciated by one ordinarily skilled, the inlet and outlet ports are adaptable for various flow protocols including batch flow, semi-batch flow, or continuous flow. In alternative embodiments, the system includes a conduit, e.g., a duct (122) for directing hydrogen gas to the anode; in various embodiments the gas comprises hydrogen formed at the cathode (110); other sources of hydrogen gas can be used.

As illustrated in FIGS. 1 and 2, the first electrolyte (104) contacts the anode (108) and ion exchange membrane (102, 124) on a first side; and the second electrolyte contacts the cathode (106) and the ion exchange membrane at an opposed side to complete an electrical circuit that includes conventional voltage/current regulator (112). The current/voltage regulator is adaptable to increase or decrease the current or voltage across the cathode and anode as desired.

With reference to FIG. 1, in an exemplary and non-limiting example using anion exchange membrane (102) and a concentrated solution of sodium chloride as the second electrolyte (116), upon applying a low voltage across the cathode (110) and anode (108), hydroxide ions are produced in the second electrolyte and hydrogen gas forms at the cathode (110), while protons form in the first electrolyte solution that is in contact with the anode (108) but a gas, e.g., chlorine or oxygen does not form at the anode (108). Where second electrolyte (106) comprises sodium chloride, chloride ions migrate into the first electrolyte (104) from the second electrolyte (106) through the anion exchange membrane (102), and protons form in the electrolyte in contact with the anode (108).

As can be appreciated by one ordinarily skilled in the art, and with reference to FIG. 1, in second electrolyte (106) as hydroxide ions form in the electrolyte in contact with the cathode (110) and enter into the second electrolyte (106), and as chloride ions migrate from the second electrolyte into the first electrolyte (104), an aqueous solution of sodium hydroxide will form in second electrolyte (106). Depending on the rate of introduction and/or removal of second electrolyte from the system, the pH of the second electrolyte is adjusted, e.g., increases, decreases or does not change. Similarly, with reference to FIG. 1, as protons form in the solution in contact with the anode and enter into the first electrolyte (104), the pH of the first electrolyte will adjust depending on rate of introduction and/or removal of first electrolyte from the system. Also, as chloride ions migrate to the first electrolyte from the second electrolyte across the anion exchange membrane, hydrochloric acid will form in the first electrolyte.

With reference to FIG. 2, in another exemplary and non-limiting embodiment, where a cation membrane (124) is used and concentrated solution of sodium chloride is used as the first electrolyte, upon applying a voltage across the cathode (110) and anode (108), hydroxide ions form in the second electrolyte and hydrogen gas forms at the cathode (110), protons form in the first electrolyte in contact with the anode but a gas, e.g., chlorine or oxygen does not form at the anode (108). Where first electrolyte (104) comprises sodium chloride, sodium ions migrate from the first electrolyte (104) to the second electrolyte (106) through the cation exchange membrane (124).

As can be appreciated by one ordinarily skilled in the art, and with reference to FIG. 2, in second electrolyte (106) as hydroxide ions form in the electrolyte in contact with the cathode (110) and enter into solution and with the migration of sodium ions into the second electrolyte, an aqueous solution of sodium hydroxide will form in second electrolyte (106). Depending on the rate of introduction and/or removal of second electrolyte from the system, the pH of the second electrolyte is adjusted, e.g., increases, decreases or does not change. Similarly, with reference to FIG. 2, as protons form in the electrolyte in contact with the anode and enter into solution, the pH of the first electrolyte will adjust depending on rate of introduction and/or removal of first electrolyte from the system, i.e., the pH of the first electrolyte may increase, decrease or does not change. Also, as sodium ions migrate from the first electrolyte across the cation exchange membrane to the second electrolyte, hydrochloric acid will form in the first electrolyte due to the presence of protons and chloride ions in the first electrolyte.

With reference to FIGS. 1 and 2, depending the flow of electrolytes in the system and the electrolytes used, e.g. saltwater, when a voltage is applied across the anode (108) and cathode (110) OH⁻ will form in the in the second electrolyte (106), and consequently cause the pH of the second electrolyte to be adjusted. In one embodiment, when a voltage of about 0.1 V or less, 0.2 V or less. 0.4V or less, 0.6 V or less, 0.8 V or less, 1.0V or less, 1.5V or less, or 2.0V or less, e.g., when a voltage of 0.8V or less is applied across the anode and cathode, the pH of the second electrolyte solution is increased; in another embodiment, when a voltage of 0.01 to 2.5V, or 0.01V to 2.0V, or 0.1V to 2.0V, or 0.1V to 1.5V, or 0.1 V to 1.0V, or 0.1V to 0.8V, or 0.1V to 0.6V, or 0.1V to 0.4V, or 0.1V to 0.2V, or 0.01V to 1.5V, or 0.01 V to 1.0V, or 0.01V to 0.8V, or 0.01V to 0.6V, or 0.01V to 0.4V, or 0.01V to 0.2V, or 0.01V to 0.1V, e.g., when a voltage of 0.1V to 2.0V is applied across the anode and cathode the pH of the second electrolyte increased; in yet another embodiment, when a voltage of about 0.1 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes.

Exemplary results achieved with the present system are summarized in Table 1.

TABLE 1

LOW ENERGY ELECTROCHEMICAL METHOD AND SYSTEM

| Volt across Electrodes | Membrane Type | Average Current | Initial pH Anode and Cathode | Final pH Anode | Final pH Cathode |
|---|---|---|---|---|---|
| 0.4 | Anion | 1.45 | 6.624 | 4.790 | 9.609 |
| 0.6 | Anion | 1.27 | 6.624 | 4.643 | 9.779 |
| 0.4 | Anion | 0.81 | 6.624 | 4.896 | 9.458 |
| 0.6 | Anion | 0.90 | 6.624 | 4.596 | 9.393 |
| 1.0 | Anion | 1.49 | 6.624 | 4.677 | 9.974 |
| 0.6 | Cation | 2.07 | 6.624 | 4.444 | 10.140 |
| 0.6 | Cation | 16.0 | 6.624 | 3.381 | 11.171 |
| 1.0 | Cation | 24.7 | 6.624 | 3.245 | 11.328 |
| 1.0 | Cation | 14.0 | 6.624 | 3.237 | 10.901 |
| 0.6 | Cation and Anion | 6.22 | 6.624 | 3.888 | 10.717 |
| 1.0 | Cation and Anion | 17.6 | 6.624 | 3.115 | 11.066 |

Figure 3:
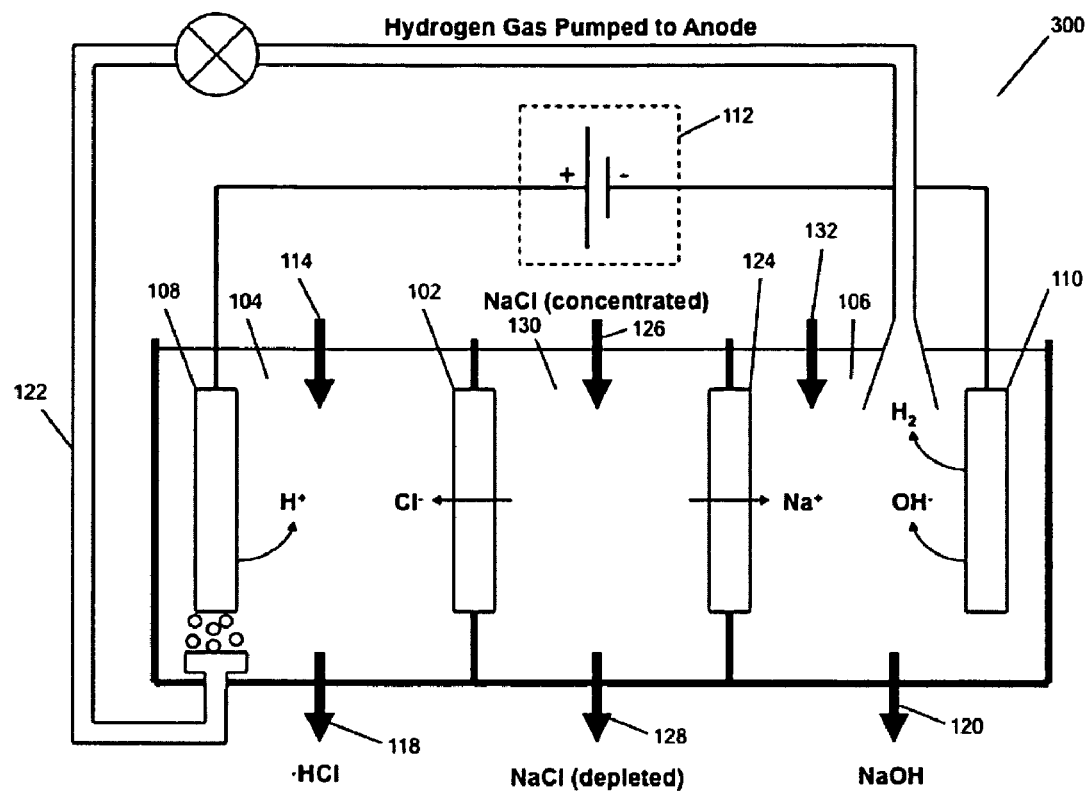
FIG. 3 is an illustration of an embodiment of the present system.

With reference to Table 1, using saltwater as the first electrolyte and a sodium chloride as the second electrolyte, a process and method in accordance with the present invention as illustrated in FIG. 1, 2, or 3 was used to adjust the pH in the first and second electrolytes. By the method and system, NaOH was produced in the second electrolyte (106), and HCl in the first electrolyte (104) at a low operating voltage across the electrodes; it will be appreciated by those of ordinary skill in the art that the voltages may be adjusted up or down from these exemplary voltages; the minimum theoretical voltage is 0 or very close to 0, but to achieve a useful rate of production of hydroxide, a practical lower limit may be in some embodiments 0.001V or 0.01V, or 0.1 V, depending on the desired time for hydroxide production and/or pH adjustment, volume of second electrolyte solution, and other factors apparent to those of ordinary skill; i.e., in some embodiments the systems and methods are capable of producing hydroxide at voltages as low as 0.001V, or 0.01 V, or 0.1V, and can also produce hydroxide at higher voltages if more rapid production is desired, e.g., at 0.2-2.0V; in some embodiments the hydroxide is produced with no gas formation at the anode, e.g., no formation of oxygen or chlorine.

The system used included two 250 mL compartments separated by an anion exchange membrane in one embodiment, and a cation membrane in another embodiment. In both compartments a 0.5M NaCl 18 MΩ aqueous solutions (28 g/L of NaCl was solvated with de-ionized water) was used. Both the anode and cathode comprised a 10 cm by 5 cm 45 mesh Pt gauze. In the anode compartment $H_2$ gas was sparged under the Pt electrode, and the two electrodes were held at a voltage bias as indicated in Table 1 e.g., 0.4, 0.6 V and 1.0 V, for 30 minutes. The pH of the electrolyte in contact with the anode before applying the voltage was 6.624. The cathode compartment where the hydroxide formation occurred was stirred at 600 rpm. As set forth in Table 1, significant changes in the pH in the cathode and anode compartment were achieved.

In these examples, and in various embodiments of the invention, a pH difference of more than 0.5, 1, 1,5, 2, 2.5, 3, 3.5, 4, 4.5, 5, 5.5, 6, 6.5, 7, 7.5, 8.0, 8.5, 9.0, 9.5, 10.0, 10.5, 11.0, 11.5, or 12.0 pH units may be produced in a first electrolyte solution and a second electrolyte solution where the first electrolyte solution contacts an anode and the second electrolyte solution contacts a cathode, and the two electrolyte solutions are separated, e.g., by one or more ion exchange membrane, when a voltage of 1.0V or less, or 0.9V or less, or 0.8V or less, or 0.7 or less, or 0.6V or less, or 0.5V or less, or 0.4V or less, or 0.3V or less, or 0.2V or less, or 0.1V or less, or 0.05V or less, is applied across the anode and cathode.

For example, in particular embodiments the invention provides a system that is capable of producing a pH difference of more than 0.5 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.05V or less is applied across the anode and cathode. In some embodiments the invention provides a system that is capable of producing a pH difference of more than 1.0 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.1V or less is applied across the anode and cathode. In some embodiments the invention provides a system that is capable of producing a pH difference of more than 2.0 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.2V or less is applied across the anode and cathode.

In some embodiments the invention provides a system that is capable of producing a pH difference of more than 4.0 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.4V or less is applied across the anode and cathode. In some embodiments the invention provides a system that is capable of producing a pH difference of more than 6 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.6V or less is applied across the anode and cathode. In some embodiments the invention provides a system that is capable of producing a pH difference of more than 8 pH units between a first electrolyte solution and a second electrolyte solution where the first electrolyte solution contacts an anode and the second electrolyte solution contacts a cathode, and the two electrolyte solutions are separated, e.g., by one or more exchange membranes, when a voltage of 0.8V or less is applied across the anode and cathode. in particular embodiments the invention provides a system that is capable of producing a pH difference of more than 8 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 1.0 V or less is applied across the anode and cathode. In some embodiments the invention provides a system that is capable of producing a pH difference of more than 10 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 1.2V or less is applied across the anode and cathode.

It will be appreciated that the voltage need not be kept constant and that the voltage applied across the anode and the cathode may be very low, e.g., 0.05V or less, when the two electrolytes are the same pH or close in pH, and that the voltage may be increased as needed as the pH difference increases. In this way, the desired pH difference or production of hydroxide ions may be achieved with the minimum average voltage. Thus in some embodiments described in the previous paragraph, the average voltage may be less than 80%, 70%, 60%, or less than 50% of the voltages given in the previous paragraph for particular embodiments.

In various embodiments and with reference to FIGS. 1-2, hydrogen gas formed at the cathode (110) is directed to the anode (108). Without being bound to any theory, it is believed that the gas is adsorbed and/or absorbed into the anode and subsequently forms protons at the anode.

In some embodiments, one or more of the electrolyte solutions is depleted in divalent cations, e.g., in magnesium or calcium, during parts of the process where the electrolyte is in contact with the ion exchange membrane (or membranes, see embodiments described below in which more than one membrane is used). This is done to prevent scaling of the membrane, if necessary for that particular membrane. Thus, in some embodiments the total concentration of divalent cations in the electrolyte solutions when they are in contact with the ion exchange membrane or membranes for any appreciable time is less than 0.06 mol/kg solution, or less than 0.06 mol/kg solution, or less than 0.04 mol/kg solution, or less than 0.02 mol/kg solution, or less than 0.01 mol/kg solution, or less than 0.005 mol/kg solution, or less than 0.001 mol/kg solution, or less than 0.0005 mol/kg solution, or less than 0.0001 mol/kg solution, or less than 0.00005 mol/kg solution.

In another embodiment as illustrated in FIG. 3, the present system (300) includes an electrolytic cell comprising an anode (108) contacting a first electrolyte (104); an anion exchange membrane (102) separating the first electrolyte from a third electrolyte (130); a second electrolyte contacting a cathode (110), and a cation exchange membrane (124) separating the second electrolyte from the third electrolyte. As can be appreciated, the ion exchange membranes are positioned in the system to prevent mixing of the first and second electrolytes. A current/voltage regulator (112) is adaptable to increase or decrease the current or voltage across the cathode and anode in the system as desired. On applying a voltage across the anode and cathode, hydroxide ions form in the solution in contact with the cathode without a gas e.g., oxygen or chlorine forming at the anode. As with the system of FIGS. 1 and 2, the system of FIG. 3 is adaptable for batch, semi-batch and continuous operation.

In system illustrated in FIG. 3, as with the systems of FIGS. 1-2, the first electrolyte (104), second electrolyte (106) and third electrolyte (130) in various embodiments comprise e.g., saltwater including seawater, freshwater, brine, or brackish water or the like. In one embodiment the third electrolyte (130) comprise substantially a solution of a sodium chloride.

In various embodiments, anion exchange membrane (102) and cation exchange membrane (124) of FIG. 3 are any suitable ion exchange membranes suitable for use in an acidic and/or basic solution at operating temperatures in an aqueous solution in the range from about 0° C. to about 100° C., or higher depending on the pressure in the system such as conventional ion exchange membranes well-known in the art, or any suitable ion exchange membrane. Suitable anion exchange membranes are available from PCA GmbH of Germany, e.g., an anion membrane identified as PCSA-250-250 can be used; similarly, a cation membrane identified as PCSK 250-250 available from PCA GmbH can be used.

With reference to FIG. 3, in various embodiments, the electrochemical cell includes first electrolyte inlet port (114) adaptable for inputting first electrolyte (104) into the system; second electrolyte inlet port (116) for inputting second electrolyte (106) into the system; and third inlet port (126) for inputting third electrolyte into the system. Additionally, the cell includes first outlet port (118) for draining first electrolyte; second outlet port (120) for draining second electrolyte; and third outlet port (128) for draining third electrolyte. As will be appreciated by one ordinarily skilled, the inlet and outlet ports are adaptable for various flow protocols including batch flow, semi-batch flow, or continuous flow. In alternative embodiments, the system includes a conduit, e.g., a duct (122) for directing gas to the anode; in various embodiments the gas comprises hydrogen formed at the cathode (110).

With reference to FIG. 3, upon applying a voltage across the cathode (110) and anode (108), hydroxide ions form in the electrolyte in contact with the cathode (110), protons form in the electrolyte in contact with the anode and gas, e.g., chlorine or oxygen does not form at the anode (108). Where third electrolyte (130) comprises sodium chloride, chloride ions migrate into the first electrolyte (104) from the third electrolyte (130) through the anion exchange membrane (102); sodium ions migrate to the second electrolyte (106) from the third electrolyte (130); protons form at the anode (104); and hydrogen gas forms at the cathode (110).

As can be appreciated by one ordinarily skilled in the art, and with reference to FIG. 3 as hydroxide ions form in the electrolyte in contact with the cathode (110) and enter into the third electrolyte concurrent with migration of sodium ions from the third electrolyte (130) into the second electrolyte (106), an aqueous solution of sodium hydroxide will form in second electrolyte (106). Depending on the voltage applied across the system and the flow rate of the second electrolyte through the system, the pH of the solution will be adjusted. In one embodiment, when a voltage of about 0.1 V or less, 0.2 V or less, or 0.3V or less, or 0.4V or less, or 0.5V or less, or 0.6V or less, or 0.7V or less, or 0.8V or less, or 0.9V or less, or 01.0V or less, or 01.2V or less, or 01.4V or less, or 1.6V or less, or 01.8V or less, or 2.0V or less, or 02.2V or less is applied across the anode and cathode, the pH of the second electrolyte solution is increased; in another embodiment, when a voltage of 0.01 to 2.5 V, or 0.01V to 2.0V, or 0.1V to 2.0V, or 0.1V to 1.5V, or 0.1 V to 1.0V, or 0.1V to 0.8V, or 0.1V to 0.6V, or 0.1V to 0.4V, or 0.1V to 0.2V, or 0.01V to 1.5V, or 0.01 V to 1.0V, or 0.01V to 0.8V, or 0.01V to 0.6V, or 0.01V to 0.4V, or 0.01V to 0.2V, or 0.01V to 0.1V, e.g., when a voltage of 0.1V to 2.0V is applied across the anode and cathode the pH of the second electrolyte is increased; in yet another embodiment, when a voltage of about 0.1.0 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0. 3 V across the electrodes. In one embodiment, a volt of about 0.6 volt or less is applied across the anode and cathode; in another embodiment, a volt of about 0.1 to 0.6 volt or less is applied across the anode and cathode; in yet another embodiment, a voltage of about 0.1 to 1 volt or less is applied across the anode and cathode.

As will be appreciated and with reference to FIG. 3, in first electrolyte (104) as proton form in the electrolyte in contact with the anode (108) and enter into the solution concurrent with migration of chloride ions from the third electrolyte (130) to the first electrolyte (104), increasingly an acidic solution will form in first electrolyte (104). Depending on the voltage applied across the system and the flow rate of the second electrolyte through the system, the pH of the solution will be adjusted as noted above.

As with the embodiments of FIGS. 1 and 2 and as is illustrated in FIG. 3, optionally hydrogen gas formed at the cathode (110) is directed to the anode (108). Without being bound to any theory, it is believed that hydrogen gas is adsorbed and/or absorbed into the anode and subsequently forms protons at the anode in contact with the first electrolyte (104). Also, in various embodiments as illustrated in FIGS. 1-3, a gas such as oxygen or chlorine does not form at the anode (108). Accordingly, as can be appreciated, with the formation of protons at the anode and migration of chloride into the first electrolyte, hydrochloric acid is obtained in the first electrolyte (104).

Figure 4:
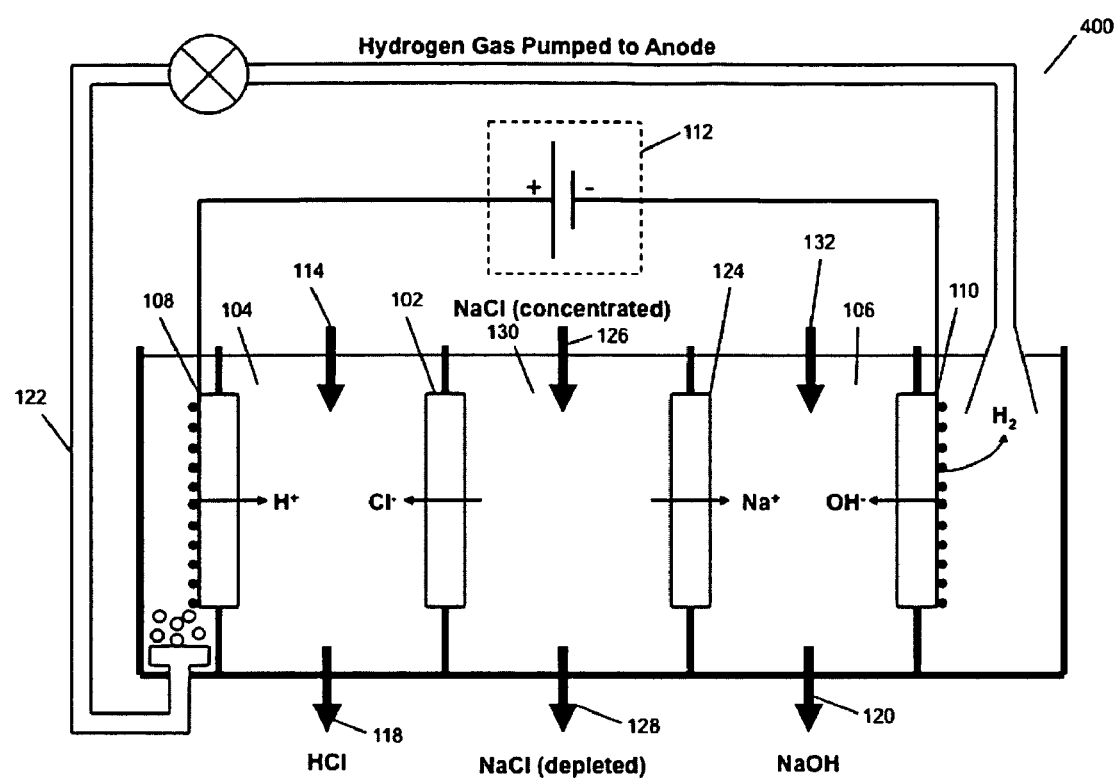
FIG. 4 is an illustration of an embodiment of the present system.

With reference to FIG. 4, which illustrates a variation of the embodiment of FIG. 3, a cation exchange membrane is in contact with the anode (108) on one surface, and in contact with the first electrolyte (104) at an opposed surface. In this configuration, as will be appreciated by one ordinarily skilled in the art, $H^+$ formed at or near the anode will migrate into the first electrolyte through the cation exchange membrane to cause the pH of the first electrolyte to be adjusted as discussed with reference to the system of FIG. 3. Similarly, at the cathode (110), an anion exchange membrane is in contact with the cathode (110) on one surface, and in contact with the second electrolyte (106) at an opposed surface. In this configuration, as will be appreciated by one ordinarily skilled in the art, $OH^-$ formed at or near the anode will migrate into the first electrolyte to cause the pH of the second electrolyte to be adjusted as discussed with reference to the system of FIG. 3. Optionally, as illustrated in FIG. 4, the hydrogen gas formed at the cathode (110) can be redirected to the anode (108) without contacting the second (106) or first (104) electrolyte.

Figure 5:
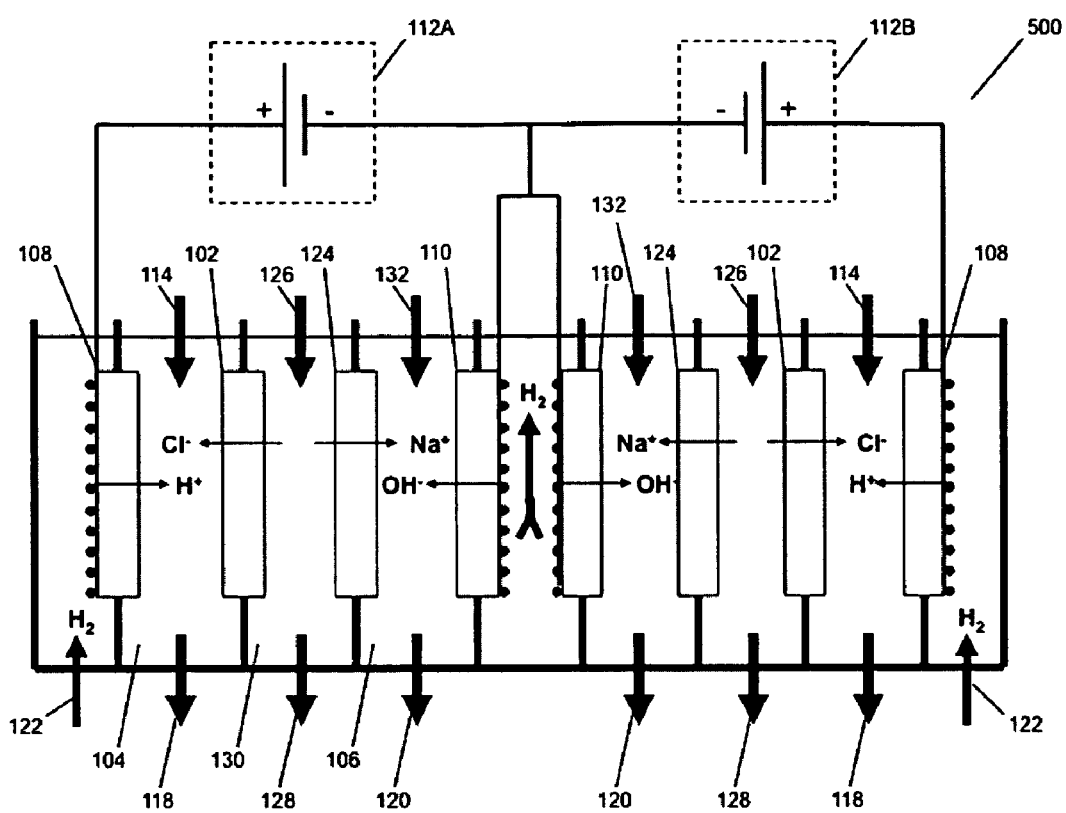
FIG. 5 is an illustration of an embodiment of the present system.

FIG. 5 illustrates a variation of the invention where at least two of the systems of FIG. 4 are configured to operate together. As can be appreciated and with reference to FIG. 5, as hydroxide ions form at the cathode (110) and enter into second electrolyte (106) and with the migration of sodium ions into the second electrolyte from the third electrolyte (130), an aqueous solution of sodium hydroxide will from in second electrolyte (106). Depending on the rate of addition and/or removal of electrolytes from the system, the pH of the second electrolyte is adjusted, e.g., increases, decreases or does not change. Also with reference to FIG. 5, in first electrolyte (104) as proton form at the anode (108) and enter into the solution concurrent with migration of chloride ions from the third electrolyte (130) to the first electrolyte (104), increasingly an acidic solution will form in first electrolyte (104).

Figure 6:
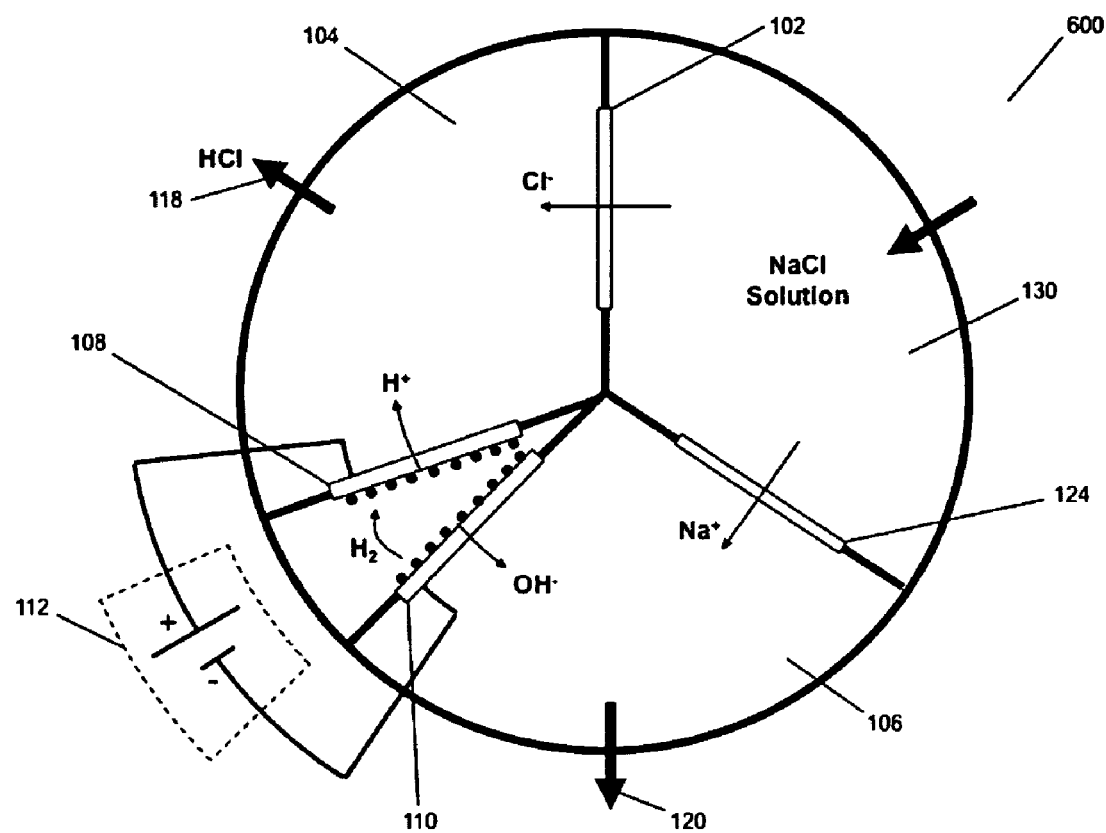
FIG. 6 is an illustration of an embodiment of the present system.

FIG. 6 illustrates a variation of the system of FIG. 3 arranged for continuous or semi-continuous flow. With reference to FIG. 6, upon applying a low voltage across the cathode (110) and anode (108), hydroxide ions form at the cathode (110), protons form at the anode and gas, e.g., chlorine or oxygen does not form at the anode (108). Where third electrolyte (130) comprises sodium chloride, chloride ions migrate into the first electrolyte (104) from the third electrolyte (130) through the anion exchange membrane (102); sodium ions migrate to the second electrolyte (106) from the third electrolyte (130) through the cation exchange membrane (124); protons form at the anode (104); and hydrogen gas forms at the cathode (110). In first electrolyte (104) as proton form at the anode (108) and enter into the solution concurrent with migration of chloride ions from the third electrolyte (130) to the first electrolyte (104), increasingly an acidic solution will form in first electrolyte (104). Depending on the voltage applied across the system and the flow rate of the second electrolyte through the system, the pH of the solution will be adjusted.

Figure 7:
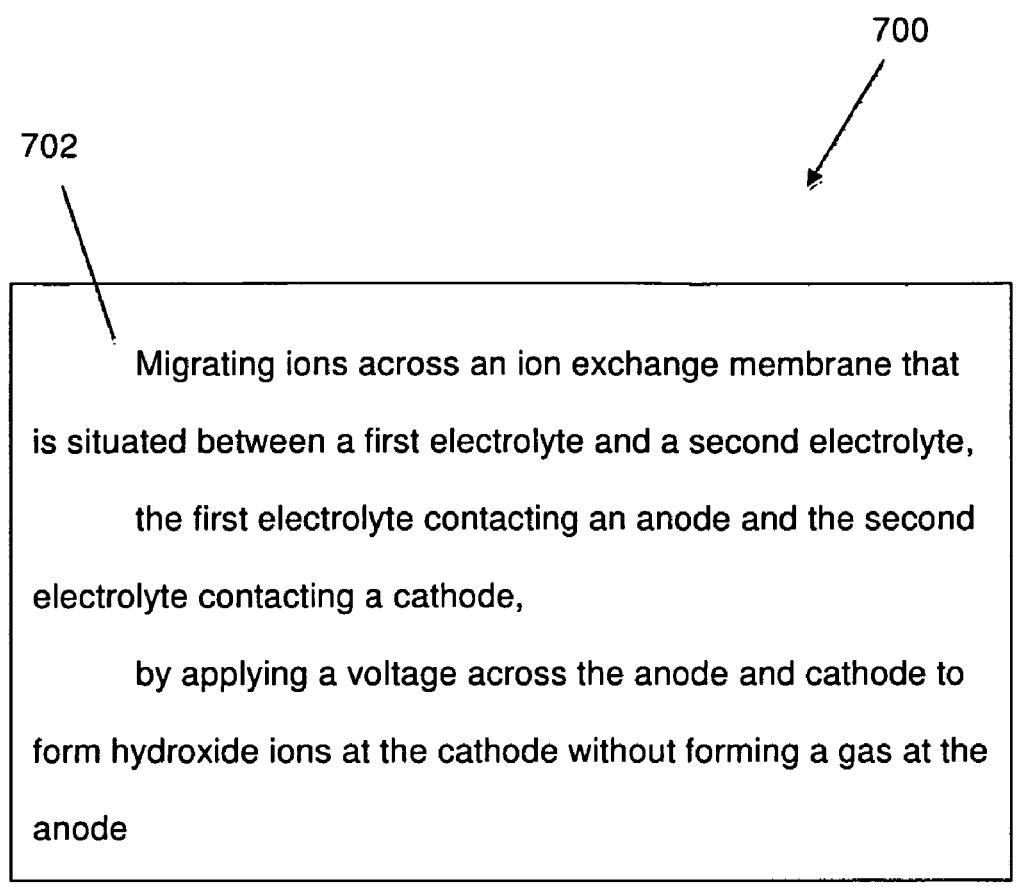
FIG. 7 is a flow chart of an embodiment of the present method.
Figure 8:
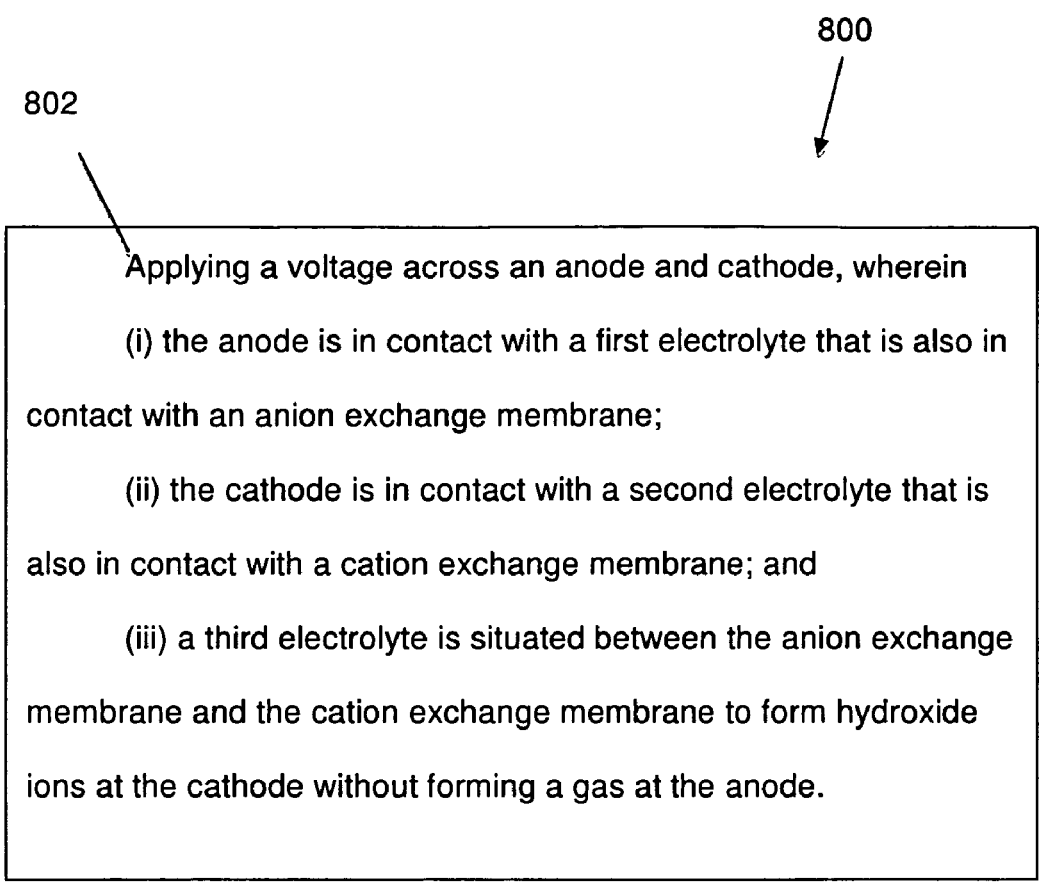
FIG. 8 is a flow chart of an embodiment of the present method.

With reference to FIGS. 1, 2 and 7 the present method in one embodiment (700) comprises a step (702) of migrating ions across an ion exchange membrane (102) that is situated between a first electrolyte (104) and a second electrolyte (106), the first electrolyte contacting an anode (108) and the second electrolyte contacting a cathode (110), by applying a voltage across the anode and cathode to form hydroxide ions at the cathode without forming a gas at the anode. As described with reference to FIGS. 1-2, as hydroxide ions from at the anode (110) and enter in to the second electrolyte (106) concurrent with migration of chloride ions from the second electrolyte, an aqueous solution of sodium hydroxide will form in second electrolyte (106). Consequently, depending on the voltage applied across the system and the flow rate of the second electrolyte (106) through the system, the pH of the second electrolyte is adjusted. Also, with the formation of protons in the first electrolyte, an acid solution will form in the first electrolyte as a result of migration of chloride ions into the first electrolyte as discussed with reference to the system of FIGS. 1 and 2.

In one embodiment, when a volt of about 0.6 volt or less is applied across the anode and cathode, the pH of the second electrolyte solution increased; in another embodiment, when a volt of about 0.1 to 0.6 volt or less is applied across the anode and cathode the pH of the second electrolyte increased; in yet another embodiment, when a voltage of about 0.1 to 1 volt or less is applied across the anode and cathode the pH of the second electrolyte solution increased. Other exemplary results achieved in accordance with the present system are summarized in Table 1.

With reference to FIGS. 3-6 and 8, in one embodiment the present method (800) comprises a step (802) of applying a voltage across an anode (108) and cathode (110), wherein: (i) the anode is in contact with a first electrolyte (104) that is also in contact with an anion exchange membrane (102); (ii) the cathode is in contact with a second electrolyte (106) that is also in contact with a cation exchange membrane; and (iii) a third electrolyte (130) is situated between the anion exchange membrane and the cation exchange membrane to form hydroxide ions at the cathode without forming a gas at the anode. As described with reference to the system of FIGS. 3-6 above, as hydroxide ions from the cathode (110) and enter in to the second electrolyte (106) concurrent with migration of sodium ions into the second electrolyte from the third electrolyte, an aqueous solution of sodium hydroxide will form in second electrolyte (106). Consequently, depending on the voltage applied across the system and the flow rate of the second electrolyte (106) through the system, the pH of the second electrolyte is adjusted. Also, with the formation of protons in the first electrolyte and the migration of chloride ions into the first electrolyte from the third electrolyte, an acid solution will form in the first electrolyte.

In all embodiments described herein, optionally, $CO_2$ is dissolved into the second electrolyte solution; as protons are removed from the second electrolyte solution more $CO_2$ may be dissolved in the form of bicarbonate and/or carbonate ions; depending on the pH of the second electrolyte the balance is shifted toward bicarbonate or toward carbonate, as is well understood in the art. In these embodiments the pH of the second electrolyte solution may decrease, remain the same, or increase, depending on the rate of removal of protons compared to rate of introduction of CO2. It will be appreciated that no hydroxide need form in these embodiments, or that hydroxide may not form during one period but form during another period. Optionally, another electrochemical system as described herein may be used to produce concentrated hydroxide, which, when added to the second electrolyte containing the dissolved CO2, causes the formation of a precipitate of carbonate and/or bicarbonate compounds such as calcium carbonate or magnesium carbonate and/or their bicarbonates. In some embodiments, divalent cations such as magnesium and/or calcium are present in certain solutions used in the process, and/or are added. The precipitated carbonate compound can be used as cements and building material as described in U.S. Patent Applications incorporated herein by reference.

In an optional step, the acidified first electrolyte solution 104 is utilized to dissolve a calcium and/or magnesium rich mineral, such as mafic mineral including serpentine or olivine, for precipitating carbonates and bicarbonates as described above. For example, the acidified stream can be employed to dissolve calcium and/or magnesium rich minerals such as serpentine and olivine to create the electrolyte solution that can be charged with bicarbonate ions and then made sufficiently basic to precipitate carbonate compounds. Such precipitation reactions and the use of the precipitates in cements are described in the U.S. Patent Applications incorporated by herein by reference.

In alternative embodiments, rather than precipitating carbonates, the carbonate and bicarbonate solution is disposed of in a location where it will be stable for extended periods of time. For example, the carbonate/bicarbonate electrolyte solution can be pumped to an ocean depth where the temperature and pressure are sufficient to keep the solution stable over at least the time periods set forth above.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. A system comprising:
   an anode electrolyte in contact with an anode;
   a cathode electrolyte comprising in contact with a cathode, wherein the system is configured to introduce carbon dioxide into the cathode electrolyte;
   a third electrolyte disposed between an anion exchange membrane and a cation exchange membrane such that the anion exchange membrane contacts the anode electrolyte and the cation exchange membrane contacts the cathode electrolyte,
   a gas delivery system configured to deliver hydrogen gas to the anode, wherein the system is configured to produce hydrogen gas at the cathode and absorb hydrogen gas and produce protons at the anode, without producing a gas at the anode, on applying a voltage across the anode and cathode; and wherein the system is further configured to add magnesium and calcium to the cathode electrolyte to precipitate magnesium and calcium carbonates, bicarbonates or hydroxides from the cathode electrolyte.

2. The system of claim 1, wherein the system is configured to produce hydroxide ions in the cathode electrolyte without forming a gas at the anode on applying a voltage of less than 0.05 V across the anode and cathode.

3. The system of claim 1, wherein the system is configured to form hydroxide ions in the cathode electrolyte without forming a gas at the anode on applying a voltage of less than 0.05 V across the anode and cathode.

4. The system of claim 1, wherein the gas delivery system is configured to direct hydrogen gas from the cathode to the anode.

5. The system of claim 1, wherein the cathode electrolyte comprises seawater, freshwater, brine, or brackish water.

6. The system of claim 1, wherein the cathode electrolyte comprises calcium or magnesium ions or a combination thereof.

7. The system of claim 1, wherein the cathode electrolyte comprises carbonate ions, bicarbonate ions, or a combination thereof.

8. The system of claim 1, wherein the third electrolyte comprises sodium chloride.

9. The system of claim 1, wherein the anode electrolyte comprises hydrochloric acid.

10. The system of claim 1, wherein the anode electrolyte comprises hydrochloric acid and the cathode electrolyte comprises sodium hydroxide and/or carbonate and/or bicarbonate.

11. The system of claim 1 or 2, wherein the system is configured to produce a pH difference of at least 4 pH units between the anode electrolyte and the cathode electrolyte.

12. The system of claim 11, wherein the system is configured to produce the pH difference of 4 pH units when a voltage of less than 0.6V is applied between the anode and the cathode.

13. The system of claim 12, wherein the system is configured to produce said pH difference in less 30 minutes.

14. The system of claim 11, wherein the system is configured to produce the pH difference of 4 pH units when a voltage of less than 0.4V is applied between the anode and the cathode.

15. The system of claim 1 or 2, configured to produce a pH difference of at least 8 pH units between the cathode electrolyte and the anode electrolyte.

16. The system of claim 15, wherein the system is configured to produce the pH difference of at least 8 pH units when a voltage of less than 0.6V is applied between the anode and the cathode.

17. The system of claim 1, configured to produce a change of at least 12.0 pH units in the cathode electrolyte or the anode electrolyte.

18. The system of claim 17, wherein the system is configured to produce the pH difference of at least 12 pH units between the cathode electrolyte and anode electrolyte when a voltage of less than 1.0 V is applied between the anode and the cathode.

19. The system of claim 1, that is configured for continuous flow operation.

20. A method comprising:
contacting an anode with an anode electrolyte and a cathode with a cathode electrolyte;
placing a third electrolyte between a cation exchange membrane and an anion exchange membrane such that the third electrolyte is separated from the cathode electrolyte by the cation exchange membrane, and is separated from the anode electrolyte by the anion exchange membrane;
dissolving carbon dioxide in the cathode electrolyte;
forming hydroxide ions in the cathode electrolyte and hydrogen at the cathode while absorbing hydrogen at the anode to form protons, by applying a voltage across the anode and cathode without forming a gas at the anode; and
adding calcium and magnesium to the cathode electrolyte and precipitating magnesium and calcium carbonates, bicarbonates or hydroxides from the cathode electrolyte.

21. The method of claim 20, wherein said voltage is less than 0.1 V.

22. The method of claim 20, wherein said voltage is less than 0.05 V.

23. The method of claim 20, further comprising directing hydrogen gas from the cathode to the anode.

24. The method of claim 20, wherein the cathode electrolyte comprises freshwater, brine, or brackish water.

25. The method of claim 20, further comprising forming sodium hydroxide in the cathode electrolyte.

26. The method of claim 20, further comprising forming hydrochloric acid in the anode electrolyte.

27. A system comprising:
an anode electrolyte contacting an anode;
a cathode electrolyte contacting a cathode, wherein the system is configured to introduce carbon dioxide into the cathode electrolyte, and
an ion-exchange membrane disposed between the anode electrolyte and the cathode electrolyte; wherein
the system is configured to produce hydroxide ions in the cathode electrolyte and hydrogen gas at the cathode while absorbing hydrogen gas at the anode to form protons without forming a gas at the anode, on applying a voltage across the anode and cathode; and
the system is further configured to add magnesium and calcium to the cathode electrolyte to precipitate magnesium and calcium carbonates, bicarbonates or hydroxides from the cathode electrolyte.

28. The system of claim 27, wherein the system is configured to produce hydroxide ions without forming a gas at the anode on applying a voltage of 0.05 V or less across the anode and cathode.

29. The system of claim 27, further comprising a gas delivery system configured for directing hydrogen gas from the cathode to the anode.

30. The system of claim 27, wherein the cathode electrolyte comprises carbon dioxide, bicarbonate ions, carbonate ions, or a combination thereof.

31. The system of claim 30, wherein the cathode electrolyte comprises calcium ions, magnesium ions, or a combination thereof.

32. The system of claim 27, wherein the cathode electrolyte comprises seawater, freshwater, brine, or brackish water.

33. The system of claim 27, wherein the cathode electrolyte comprises sodium hydroxide.

34. The system of claim 27, wherein the anode electrolyte comprises hydrochloric acid.

35. The system of claim 27, wherein the system is configured to produce a pH difference of at least 4 pH units between the anode electrolyte and the cathode electrolyte.

36. The system of claim 27, wherein the system is configured to produce the pH difference of 4 pH units when a voltage of less than 0.6 V is applied between the anode and the cathode.

37. The system of claim 36, wherein the system is configured to produce said pH difference in less 30 minutes.

38. The system of claim 27, wherein the system is configured to produce the pH difference of 4 pH units when a voltage of less than 0.4V is applied between the anode and the cathode.

39. The system of claim 1 or 27, configured to produce a pH difference of at least 8 pH units between the cathode electrolyte and the anode electrolyte.

40. The system of claim 39, wherein the system is configured to produce the pH difference of at least 8 pH units when a voltage of less than 0.6 V is applied between the anode and the cathode.

41. The system of claim 27, configured to produce a change of at least 12.0 pH units in the cathode electrolyte or the anode electrolyte.

42. The system of claim 41, wherein the system is configured to produce a pH difference of at least 12 pH units when a voltage of less than 1.0 V is applied between the anode and the cathode.

43. A method comprising:
contacting an anode with an anode electrolyte, and a cathode with a cathode electrolyte, wherein the anode electrolyte and the cathode electrolyte are separated by an ion exchange membrane;
dissolving carbon dioxide in the cathode electrolyte;
forming hydroxide ions in the cathode electrolyte and hydrogen gas at the cathode while absorbing hydrogen at the anode to form protons, by applying a voltage across the anode and cathode without forming a gas at the anode; and
adding calcium and magnesium to the cathode electrolyte and precipitating magnesium and calcium carbonates, bicarbonates or hydroxides from the cathode electrolyte.

44. The method of claim 43, comprising forming hydroxide ions by applying a voltage of 0.05 V or less across the anode and cathode.

45. The method of claim 43, further comprising directing hydrogen gas from the cathode to the anode.

46. The method of claim 43, wherein the cathode electrolyte comprises freshwater, brine, or brackish water.

47. The method of claim 43, comprising forming sodium hydroxide in the cathode electrolyte and hydrochloric acid in the anode electrolyte.

* * * * *